Patented Aug. 7, 1945

2,381,677

UNITED STATES PATENT OFFICE 2,381,677

PROCESS OF TREATING CATALYSTS

Maryan P. Matuszak, Bartlesville, Okla., assignor to Phillips Petroleum Company, a corporation of Delaware No Drawing. Application February 7, 1942, Serial No. 429,958

18 Claims. (Cl. 260—680)

This invention relates to a process of treating contact catalysts. More particularly, this invention relates to the treatment of solid dehydrogenation catalysts which display an induction period. This application is a continuation-in-part of my copending application, Serial No. 205,109, filed April 29, 1938, which has issued as Patent No. 2,274,988.

Many contact catalysts display at the start of a period of use for effecting chemical reactions a more or less extended induction period during which only an inferior amount of conversion is effected. Green ("Industrial Catalysis," p. 16 (1928)) says, "A period of induction—generally short—during which the catalytic surface is becoming accommodated to its function is characteristic of most contact catalysts." Such induction periods have long been observed. They have been frequently found in connection with, but they are not limited to, catalytic reactions involving hydrogen. Ellis ("Hydrogenation of Organic Substances," third edition, p. 113 (1930)), in discussing the hydrogenation work of the pioneers, Sabatier and his collaborators, says that these investigators state that there is "A short period when the catalyst is becoming 'accustomed' to the atmosphere of hydrogen and the body to be treated."

When such an induction period is short, extending for only a few minutes, it is considered not very troublesome and may be ignored. But when it extends to upwards of an hour or more, it occasions considerable trouble, and it is then highly objectionable and disadvantageous. It then demands unprofitable use of the catalyst for a more or less extended period of time, and in a continuous or flow process it causes the production of effluents which are not uniform in composition and which, because of the low yield, must be processed and recycled at additional expense.

Catalysts which, when first used, display but a short and, for practical purposes, negligible induction period frequently change with long-continued use, repeated reactivations, or with special treatment which otherwise would be desirable, and develop a more lengthy induction period which cannot be ignored. As far as I am aware, no process of treating such catalysts for the purpose of eliminating or minimizing such troublesome and disadvantageous induction period, or of shortening the time required by the catalytic surface to become accommodated to its function, had been developed or used before that disclosed in my aforementioned copending application. Theretofore catalysts with long induction periods have generally been discarded or reworked by extensive chemical treatment into fresh catalysts, which is attended by considerable inconvenience and expense. This lack of a suitable process of eliminating or minimizing a catalytic induction period has been a major defect and disadvantage of the prior art.

Another defect and disadvantage of the prior art related to catalysts which had deteriorated to the extent that they were no longer capable of effecting efficient or useful conversion for suitably long periods of time although they were still capable of efficient or useful conversion for a fraction of the usual operating period, such as one-half or more. By operating period is meant a period of use of the catalyst for effecting a catalytic conversion such as hydrogenation, dehydrogenation, hydration, dehydration, polymerization, depolymerization, cracking, oxidation, reduction, or other catalytically promoted chemical reactions for the synthesis or decomposition of chemical compounds. After such a period of use the catalyst is ordinarily reactivated, revivified, or regenerated before it can be used in the succeeding operating period. The duration of an operating period may generally be determined by factors quite extraneous to the activity of the catalyst, such as definite or prearranged hours for shifting of labor crews, availability of additional catalyst supplies, and similar factors which are familiar to those skilled in the art. Under these circumstances, it has heretofore been necessary to continue an undesirably low conversion, or to interrupt the operations for the purpose of reactivating the catalyst, or to increase the reaction or operating temperature of the catalyst, or to increase the time of contact between catalyst and reactant material. All of these actions under certain conditions are definitely disadvantageous or inconvenient and often involve costly disturbance of the operating schedule and of the most desirable balancing among the interrelated unit processes which, together with the catalytic conversion process itself, make up the ensemble of plant operations.

It will be understood that by the word catalyst is meant herein a contact material which is in condition for effecting a catalytic conversion and which does not require a preliminary decomposition, reduction, or other treatment that effects a chemical change in the material. For example, in the case of catalysts consisting of or comprising one or more metals or lower oxides of metals or metalloids, which catalysts are generally prepared by reduction of oxides and/or salts, it will be assumed hereinafter that the reduction has been effected. Before use, such catalysts are generally kept out of contact with deleterious materials that may poison the catalyst or effect an undesired chemical change in the catalyst. This is generally accomplished by keeping the catalyst in a protecting fluid atmosphere containing or comprising one or more gases or liquids that do not react irreversibly with the catalyst. Gases or liquids that do react irreversibly with the catalyst are generally excluded from such protecting atmosphere. Frequently used and usually suitable gases are hydrogen, nitrogen, carbon dioxide, and the like; but it will be understood that the choice of a suitable gas may vary with different catalysts and that a gas suitable for a particular catalyst may be unsuited for some other particular catalyst. However, a suitable choice may be readily determined by trial.

The aforementioned copending application discloses that heating a catalyst, prior to or during a period of use and in the effective absence of materials that react irreversibly with the catalyst, to a dynamizing temperature higher than the operating temperature at which it is to be subsequently used for effecting a catalytic conversion, produces in the catalyst a mobile or transitory state or condition termed dynamization, whereby the catalyst, on being cooled to the operating or conversion temperature relatively rapidly, or in an atmosphere of a gas of the zero group of the periodic table, or in a high vacuum as represnted by an absolute pressure of about 0.1 mm. of mercury or less, becomes capable of effecting at once a greater conversion than it could immediately effect if heated initially only to the operating temperature. The state of dynamization is a transitory and not a permanent condition of the catalyst in the sense that it does not persist indefinitely or from one period of use to another period of use or through an intervening period of reactivation, revivification, or regeneration of the catalyst.

One of the objects of the present invention is to reduce the more or less extended induction period displayed by many dehydrogenation catalysts.

Another object is so to treat a dehydrogenation catalyst that it displays a high catalytic activity at the beginning of a period of use instead of after a more or less extended induction period.

Still another object is to increase the activity of a dehydrogenation catalyst in the midst of a period of use without recourse to relatively undesirable operations such as time-consuming revivification or the use of objectionable or disadvantageous operating conditions.

Other objects and advantages of this invention will be apparent from the following description and examples.

In the practice of the present invention, a dehydrogenation catalyst is dynamized, prior to or during a period of use for the dehydrogenation of an organic compound, by subjecting it at an elevated temperature to the action of a sequence of atmospheres such that an atmosphere predominantly comprising free hydrogen is contiguously succeeded by a second or flushing atmosphere comprising an excess of an unsaturated organic compound relatively or thermodynamically more unsaturated than the organic compound to be dehydrogenated, the action of the second atmosphere being effected immediately prior to a period of use for dehydrogenation of the organic compound to be dehydrogenated.

Although the exact nature of the effects produced by the practice of this invention is not completely understood, a possible explanation, based on the theory of adsorption, is as follows. Immediately prior to a period of use, a dehydrogenation catalyst may be expected to contain many adsorbed extraneous molecules, which may have come into contact with it during its preceding phase of existence, such as preparation, use, revivification, or storage in a protecting atmosphere. Naturally, some molecules, such as those of water, sulfur compounds, and oxides of carbon, may be adsorbed somewhat more strongly than others, such as hydrogen and nitrogen; and some molecules, such as those of the rare-gas elements, may be adsorbed only relatively slightly or not at all. Because the adsorption is reversible, the adsorbed molecules can be removed, as by heating to a sufficiently high temperature and/or pumping to a sufficiently low pressure. They can also be displaced by other molecules, especially when the latter are in relatively high concentration; for example, sufficiently long-continued flushing of the catalyst at an elevated temperature with an atmosphere consisting predominantly or substantially entirely of free hydrogen effects practically complete displacement of the adsorbed water, carbon oxides, nitrogen, and/or other molecules with hydrogen molecules. As the hydrogen molecules are themselves fairly strongly adsorbed, especially at dehydrogenation temperatures, they prevent the catalyst from at once displaying its full potential or inherent catalytic activity if it is placed into service for the dehydrogenation of an organic compound; wherefore the catalyst is said to display an induction period. During this induction period, the adsorbed hydrogen molecules are gradually displaced by molecules of the organic compound until eventually molecules of the organic compound are in contact with the catalyst for the dehydrogenation to be at the maximum for the catalyst in hand; whereupon the induction period is said to be at an end. Adsorbed molecules other than hydrogen may produce induction periods in much the same way; but, from the point of view of the present invention, hydrogen molecules have the decided advantage that they can be readily removed from the catalyst surface by a brief flushing with a relatively unsaturated organic compound. Flushing of the catalyst with a relatively unsaturated organic compound thus removes the adsorbed hydrogen molecules, and, if immediately there-after the catalyst is placed into service for the desired dehydrogenation, the induction period is found to be substantially reduced or eliminated.

As this possible theoretical explanation is suggested only as an aid to the understanding of this invention, it should not be construed as limiting the invention.

Treatment of a dehydrogenation catalyst with hydrogen is sometimes practiced incidentally during the preparation of the catalyst, in order to effect chemical reduction of one or more compounds incorporated therein. The hydrogen in such treatment ordinarily may be replaced by some other reducing agent, such as hydrocarbons, carbon monoxide, or the like; but in the practice of this invention, such other reducing agent is not an equivalent of hydrogen, since it does not react with unsaturated organic compounds in the manner of hydrogen. Similarly, treatment with hydrogen sometimes is practiced incidentally during heating of the catalyst to the selected dehydrogenation temperature, in order to protect the catalyst against oxidation or against poisoning by catalyst poisons that may be in the atmosphere. The hydrogen in such treatment ordinarily may be replaced by some other inert material, such as nitrogen; but in the practice of this invention, such other inert material is not an equivalent of hydrogen, since it also does not react with unsaturated organic compounds in the manner of hydrogen.

When treatment of the catalyst with hydrogen already is being practiced, further treatment with hydrogen is unnecessary for the practice of this invention, provided that it has been continued at an elevated temperature, which advantageously should be at least as high as the subsequent dehydrogenation temperature, for a period sufficient to remove the major part of the adsorbed molecules of such extraneous and undesired materials as water, carbon oxides, and the like, which behave as temporary poisons. A period of about half an hour or an hour at the dehydrogenation temperature is usually sufficient, but it suitably may be longer or shorter in some instances; a suitable period may be readily determined by trial. Although removal of the extraneous molecules is expedited by increase in temperature, the operating temperature selected for the subsequent dehydrogenation is ordinarily sufficiently elevated and is preferred, since the subsequent cooling that would be otherwise necessary is obviated; however, if desired, temperatures up to the temperature at which deterioration of the catalyst is appreciable, can be used. The hydrogen preferably should be pure and free from catalyst poisons, but considerable minor proportions of relatively difficultly adsorbable compounds, such as nitrogen or methane, can be tolerated. The pressure of the hydrogen may be any that is convenient, such as atmospheric or higher; but, if desired, a subatmospheric or reduced pressure may be used, provided that the equipment is airtight.

The atmosphere comprising a relatively unsaturated organic compound, with which the catalyst is flushed or treated after the treatment with hydrogen, suitably may be one or more of the unsaturated products of dehydrogenation. For example, if the catalyst is to be used for the dehydrogenation of hydrocarbons, the unsaturated hydrocarbons resulting from the dehydrogenation constitute a suitable flushing atmosphere. However, not all unsaturated hydrocarbons are equally suitable; high concentrations of some unsaturated hydrocarbons, such as the acetylenes, that are relatively easily converted into heavy carbonaceous materials that may become deposited on the catalyst and that consequently rapidly deactivate the catalyst, preferably should be avoided. Of all unsaturated hydrocarbons, ethylene appears to be the most advantageous, because it is least likely to polymerize and/or decompose, and because it has a relatively high affinity for hydrogen at the temperatures best suited for the dehydrogenation of heavier hydrocarbons; thus it usually removes hydrogen from the catalyst more rapidly and more completely than do other unsaturated hydrocarbons. If, however, ethylene is not readily available, an unsaturated product of the dehydrogenation for which the catalyst is to be used is preferably used as the flushing medium, because of its availability. For example, propylene, butylenes, or amylenes may be used to treat catalysts that are to be used for dehydrogenating propane, butanes, or pentanes, respectively; butadiene or pentadienes may be used to treat catalysts to be used for dehydrogenating butylenes or amylenes, respectively; and cyclic hydrocarbons, such as benzene, toluene, or the like, may be used to treat catalysts to be used for dehydrogenating relatively hydrogen-rich hydrocarbons convertible by the catalyst to such cyclic hydrocarbons. Analogously, other unsaturated organic compounds may be used to treat catalysts to be used for preparing them by dehydrogenation of more saturated organic compounds. In general, the flushing medium should comprise an unsaturated organic compound capable of uniting with hydrogen adsorbed on the catalyst without depositing an excessive amount of carbonaceous material on the catalyst; the suitability of any particular organic compound can be readily determined by trial. The amount of unsaturated organic compound is not critical, provided that it is enough to remove all or a major part of the adsorbed hydrogen; usually a vapor volume of one to twenty times the catalyst space is adequate.

In order that deposition of carbonaceous matter on the catalyst may be minimized, the temperature of the catalyst during the flushing with the atmosphere comprising a relatively unsaturated organic compound preferably should not exceed the operating temperature to be used at the beginning of the subsequent dehydrogenation. If desired, the temperature may be considerably lower than the dehydrogenation temperature, as any temperature at which the catalyst has a high degree of activity for hydrogenating the unsaturated organic compound is effective; but especially when the flushing is only long enough to remove the adsorbed hydrogen, the use of a temperature other than the subsequent dehydrogenation temperature is usually not warranted.

The time required for the flushing is ordinarily very short, as the reaction between the unsaturated organic compound and the adsorbed hydrogen is exceedingly rapid. A time of a few seconds to a minute is usually sufficient, provided that at least enough of the unsaturated organic compound to be approximately equivalent to the adsorbed hydrogen is used. A time much longer than that necessary for removal of the adsorbed hydrogen should be avoided, since the unsaturated organic compound usually has a tendency to polymerize and to deposit carbonaceous matter on the catalyst; but, especially when ethylene is used, a time of several minutes or more sometimes can be used without great harm.

Deposition of carbonaceous matter on the catalyst during the flushing may be reduced appreciably by reducing the concentration of the unsaturated organic compound in the flushing atmosphere. Although the reduction in concentration may be effected by the use of a relatively low or a subatmospheric pressure, it is usually more conveniently effected by the use of a diluent, which preferably should be free from catalyst poisons. Theoretically, a relatively difficultly adsorbable diluent, other than free hydrogen, such as any of the rare-gas elements, nitrogen, methane, or the like, is to be preferred. Practically, however, the most advantageous diluent is the organic compound that is to be dehydrogenated, since it is most readily available and since it does not introduce an extraneous material that must be separated or discarded at additional expense. This diluent may be used in any proportion that does not reduce the concentration of unsaturated organic compound in the flushing atmosphere below that required for a satisfactory removal of adsorbed hydrogen from the catalyst. It will be understood that this removal need not be complete but need be only sufficient to reduce the content of adsorbed hydrogen in the catalyst to the point at which the usual induction period is substantially reduced or eliminated.

A preferred modification of this invention is as follows. The dehydrogenation catalyst is maintained for about half an hour in a flowing atmosphere of hydrogen at the temperature to be used in the subsequent dehydrogenation. A stream of the organic compound to be dehydrogenated is then established through the catalyst bed under the conditions to be used in the dehydrogenation itself except that a considerable addition of the relatively unsaturated organic compound is made to the stream for about half a minute. The "slug" of unsaturated organic compound thus inserted into the stream of organic compound to be dehydrogenated apparently removes enough of the hydrogen adsorbed on the catalyst so that dehydrogenation of the organic compound begins at once at the desired high-degree instead of the relatively low-degree characteristic of an induction period.

As in the process disclosed in the aforementioned copending application, the present process may be used to effect a lengthening of a conversion period when the catalyst has become deactivated to the extent that the desired degree of conversion is not being maintained. In such case, the stream of organic compound being dehydrogenated is replaced by a stream of hydrogen for a period of about half an hour to an hour or more. During this period the temperature of the catalyst advantageously may be increased by any feasible amount, such as about 50 to 150° C., and then it is returned to that used during dehydrogenation. The flushing or hydrogen-removal treatment is then effected as has been described, and the dehydrogenation is resumed.

Used in this way, the present dynamization process is of practical value when in the midst of an operating period it is found that the catalyst is not causing sufficient conversion to make its continued use profitable or desirable, due to some cause such as a partial permanent deterioration of the catalyst, or a temporary poisoning of the catalyst, or an excessive deposition of carbonaceous or other matter because of an unfavorable composition of the reactant feed stock, or the like, and it is desired nonetheless to continue operating with the catalyst for a further more or less extended period of time. The dynamization process may be used regularly to extend the usual operating or conversion period but it may be of greatest usefulness as an emergency or reserve procedure under circumstances that make it undesirable to stop operating the catalytic conversion process at the moment to reactivate the catalyst, as for example, when the length of each operating period is determined not by the state of activity of the catalyst but by extraneous circumstances such as definite or predetermined hours of shifting of labor crews, availability of additional catalyst supplies, and the like.

The process of dynamization of this invention should not be confused with the radically different process of reactivation, revivification, or regeneration mentioned herein. In the latter process, the catalyst is treated with a chemically reactive fluid for the purpose of removing by chemical reaction any carbonaceous or other matter deposited on the catalyst during a preceding period of use in a catalytic conversion process. During such reactivation, the catalyst itself usually undergoes a chemical reaction with the reactivating fluid and must be chemically restored before being used again. The reactivation must generally be conducted at a much lower temperature than the dynamizing temperature of this invention. It is also generally much more time-consuming than the present dynamization process.

Likewise, the dynamizing process of this invention should not be confused with other and old processes wherein chemical and/or physical changes are produced in catalytic contact masses. For example, dynamization is not in any sense an activation of a contact mass whereby a chemical change such as a dehydration, a reduction, an oxidation, or in general any definite chemical reaction is effected within the contact mass to render it catalytically active or to increase any previously held degree of catalytic activity. Nor does it comprise any procedure of activation in which a chemical substance or substances such as substances commonly called promoters or activators or accelerators are added to the catalyst for the purpose of changing the catalytic or adsorptive properties of the surface thereof. Similarly, it is not an activation comprising a readily recognizable or measurable physical change such as a change in porosity, or in physical structure, or in state of subdivision, or in state of agglomeration, or the like. Such old chemical and/or physical changes, in contradistinction to the transitory dynamical change produced by dynamization, are permanent and do not disappear in the presence of gases that are in general chemically reactive but which in particular are inert to the catalyst in the sense that they do not react irreversibly with the catalyst.

It is clear from the foregoing general description that this invention is broadly applicable to a large number of solid or contact catalysts. Catalysts free from an induction period under the conditions of operation of the prior art are naturally excluded from the province of this invention insofar as its use for elimination or reduction of induction period is concerned. The invention is not to be limited to any particular composition of catalyst, or to any particular reactions aided or effected by the catalysts, or to any particular operating conditions of temperature and the like, except as set forth in the appended claims. No useful purpose would be accomplished by enumeration of the multitude of now known catalysts that may be dynamized by the process of this invention. Hence, in the interest of brevity and not by way of limiting this invention, the following purely illustrative specific examples of its mode of operation are limited to only a few dehydrogenation catalysts.

*Example I*

After repeated use for the dehydrogenation of hydrocarbons, as of isobutane to isobutylene, and after repeated revivification, a catalyst comprising black chromium oxide, such as that formed by nonspontaneous thermal decomposition of chromium compounds, such as precipitated chromic hydroxide or crystalline ammonium-containing salts of chromic acid, may have an induction period of several hours; that is, when the catalyst is heated, for example, to 450° C. in an atmosphere of hydrogen, and then isobutane is passed over the catalyst at a pressure of one atmosphere and at a flow rate of 2.5 liters per hour per cubic centimeter of catalyst, a period of several hours is required for the conversion to increase from an initial value of only a few per cent to the equilibrium value of about 17 per cent. If, however, shortly after the stream of isobutane is established, such an amount of isobutylene is added to the isobutane that the resulting mixture coming into contact with the catalyst during about a minute contains about one fourth isobutylene and three fourths isobutane, the conversion reaches the equilibrium value of 17 per cent within a few minutes.

*Example II*

A repeatedly used-and-revivified catalyst comprising a minor proportion of green chromic oxide deposited on alumina has an induction period of an hour or more when used for the dehydrogenation of one or more amylenes to pentadienes after being heated, as from the revivification temperature to the dehydrogenation temperature of about 550 to 650° C., in a stream of hydrogen. If, however, the catalyst is flushed with an atmosphere comprising chiefly ethylene for a few minutes before the dehydrogenation is begun, the induction period is found to be markedly reduced. A similar result is obtained if the ethylene is diluted with up to about four volumes of nitrogen or of light paraffins such as methane and ethane. A similar result is also obtained if, instead of ethylene, pentadiene diluted with relatively saturated hydrocarbons of the same or a smaller number of carbon atoms per molecule, as with about one to four volumes of amylene, is used; undiluted pentadiene may be used if the flushing period is only a minute or so long and if it is immediately followed by the amylene to be dehydrogenated, but some deactivation of the catalyst may then be experienced.

*Example III*

A catalyst consisting of granular bauxite impregnated with up to about 5 per cent of barium hydroxide or similar alkaline-earth compound usually has an induction period of two to five hours when used for the conversion of normal butylenes to butadiene at a temperature of about 600 to 670° C. and a flow rate of about one volume of liquefied butylenes per volume of catalyst per hour. If, immediately before being used, it is treated with hydrogen at the dehydrogenation temperature for 10 to 30 minutes, and is then flushed for a few minutes with butylene to which has been added enough butadiene to exceed about 20 per cent, the catalyst effects at once or within a few minutes the maximum degree of conversion, instead of only after the usual induction period.

*Example IV*

A chromium oxide gel catalyst in use for the dehydrogenation of hydrocarbons eventually becomes somewhat deactivated, with the result that the extent of dehydrogenation falls below that desirable for further economical operation. For example, if normal butane is being dehydrogenated to butylenes at a temperature of about 450° C., continued operation may become uneconomical when the degree of dehydrogenation decreases below about 10 per cent. Instead of an immediate time-consuming revivification in which carbonaceous matter deposited on the catalyst is removed by oxidation with air, the dehydrogenation may be interrupted, and the catalyst may be restored to a relatively high activity by being treated as follows. A stream of hydrogen is passed through the catalyst for half an hour or more; during this treatment with hydrogen, the temperature of the catalyst is preferably increased to between 500 and 600° C. and is then returned to the usual dehydrogenation temperature. The stream of normal butane is then re-established, and a "slug" of butylenes is added for about a minute at such a rate that the concentration of butylenes in the resulting mixture is between about 20 and 50 per cent. With the passage of this mixture through the catalyst bed, the dehydrogenation is at once resumed, and an economical extent of dehydrogenation is again obtained for a more or less extended period.

The term dehydrogenation as used herein is meant to include not only the removal of hydrogen but also any accompanying reactions resulting in isomerization or in rearrangement of the carbon skeleton of the organic compound, as, for example, cyclization of aliphatic hydrocarbons having six or more carbon atoms per molecule.

The foregoing examples have been given as illustrations only and not as limitations of this invention. Together with the more general description preceding them herein, they furnish a clear understanding of the mode of operation of the invention, and indicate a few of its many possible variations or modifications. Other variations will be obvious to those skilled in the art and should not be excluded from the scope of the invention. The scope of the invention should not be unduly limited by the details of materials, temperatures, and other specific conditions mentioned in the examples, or by the more or less theoretical statements given hereinbefore to clarify the mode of operation of the invention, except as specified by the appended claims.

I claim:

1. In a process for the catalytic dehydrogenation of a hydrocarbon, the method for reducing the induction period of the catalyst for said dehydrogenation, which comprises heating the catalyst at an elevated temperature in an atmosphere containing free hydrogen and subsequently flushing the catalyst for a period not in excess of several minutes with a gas comprising a substantial proportion of a hydrocarbon that is more unsaturated than the hydrocarbon which is to be dehydrogenated in the process, and thereafter passing the hydrocarbon that is to be dehydrogenated and that is substantially free from more-unsaturated hydrocarbons over the flushed catalyst.

2. In a process for the catalytic dehydrogenation of a hydrocarbon, the method for reducing the induction period of the catalyst for said dehydrogenation, which comprises heating the catalyst at an elevated temperature in an atmosphere containing free hydrogen and subsequently flushing the catalyst for a period not in excess of several minutes with a gas comprising a substantial proportion of a hydrocarbon that is more unsaturated and has fewer carbon atoms per molecule than the hydrocarbon which is to be dehydrogenated in the process, and thereafter passing the hydrocarbon that is to be dehydrogenated and that is substantially free from more-unsaturated hydrocarbons over the flushed catalyst.

3. In a process for the catalytic dehydrogenation of a paraffin hydrocarbon, the method for reducing the induction period of the catalyst for said dehydrogenation, which comprises heating the catalyst at an elevated temperature in an atmosphere containing free hydrogen and subsequently flushing the catalyst for a period not in excess of several minutes with a gas comprising a substantial proportion of a hydrocarbon that is more unsaturated than the paraffin hydrocarbon which is to be dehydrogenated in the process, and thereafter passing the hydrocarbon that is to be dehydrogenated and that is substantially free from more-unsaturated hydrocarbons over the flushed catalyst.

4. In a process for the catalytic dehydrogenation of a hydrocarbon, the method for reducing the induction period of the catalyst for said dehydrogenation, which comprises heating the catalyst at an elevated temperature in an atmosphere containing free hydrogen and subsequently flushing the catalyst for a period not in excess of several minutes with a mixture containing the hydrocarbon that is to be dehydrogenated together with a substantial proportion of a hydrocarbon that is more unsaturated than the hydrocarbon which is to be dehydrogenated, and thereafter passing the hydrocarbon that is to be dehydrogenated and that is substantially free from more-unsaturated hydrocarbons over the flushed catalyst.

5. In a process for the catalytic dehydrogenation of a hydrocarbon, the method for reducing the induction period of the catalyst for said dehydrogenation, which comprises heating the catalyst to a temperature at least as high as the dehydrogenating temperature while passing a stream containing free hydrogen into contact with said catalyst and subsequently flushing said catalyst for a period not in excess of several minutes with a stream comprising a hydrocarbon that is more unsaturated than the hydrocarbon which is to be dehydrogenated in the process, and thereafter passing the hydrocarbon that is to be dehydrogenated and that is substantially free from more-unsaturated hydrocarbons over the flushed catalyst.

6. In a process for the catalytic dehydrogenation of a hydrocarbon material, the method for reducing the induction period of the catalyst for said dehydrogenation, which comprises heating the catalyst to a temperature at least as high as the dehydrogenating temperature in an atmosphere containing free hydrogen and subsequently flushing said catalyst for a period not in excess of several minutes with a hydrocarbon mixture comprising a substantial proportion of one of the principal dehydrogenated products of said dehydrogenation process, and thereafter passing the hydrocarbon that is to be dehydrogenated and that is substantially free from more-unsaturated hydrocarbons over the flushed catalyst.

7. In a process for the catalytic dehydrogenation of a paraffin hydrocarbon, the method for reducing the induction period of the catalyst for said dehydrogenation, which comprises heating the catalyst at an elevated temperature in an atmosphere containing free hydrogen and subsequently flushing the catalyst for a period not in excess of several minutes with a gas comprising a substantial proportion of ethylene, and thereafter passing the hydrocarbon that is to be dehydrogenated and that is substantially free from more-unsaturated hydrocarbons over the flushed catalyst.

8. In a process for the catalytic dehydrogenation of a hydrocarbon that is more saturated than a diolefin and having at least four and less than six carbon atoms per molecule, the method for reducing the induction period of the catalyst for said dehydrogenation, which comprises heating the catalyst at an elevated temperature in an atmosphere containing free hydrogen and subsequently flushing the catalyst with a gas comprising a substantial proportion of a diolefin having the same number of carbon atoms as the hydrocarbon which is to be dehydrogenated in the process, and thereafter passing the hydrocarbon that is to be dehydrogenated and that is substantially free from more-unsaturated hydrocarbons over the flushed catalyst.

9. In a process for the catalytic dehydrogenation of a hydrocarbon, the method for extending the useful life of the catalyst for said dehydrogenation, which comprises interrupting the passage of hydrocarbon material to the catalyst, passing a stream containing free hydrogen into contact with said catalyst while it is maintained at approximately the dehydrogenating temperature, subsequently flushing the catalyst for a period not in excess of several minutes with a gas comprising a substantial proportion of a hydrocarbon that is more unsaturated than the hydrocarbon which is being dehydrogenated, and immediately thereafter resuming the passage to the catalyst of the hydrocarbon material which is to be dehydrogenated and which is substantially free from more-unsaturated hydrocarbons.

10. In a process for the catalytic dehydrogenation of a hydrocarbon, the method for extending the useful life of the catalyst for said dehydrogenation, which comprises interrupting the passage of hydrocarbon material to the catalyst, passing a stream containing free hydrogen into contact with said catalyst while it is maintained at a temperature of approximately 50° to 150° C. higher than the dehydrogenating temperature, subsequently reestablishing the dehydrogenating temperature in the catalyst, flushing the catalyst for a period not in excess of several minutes with a gas comprising a substantial proportion of a hydrocarbon that is more unsaturated than the hydrocarbon which is being dehydrogenated, and immediately thereafter resuming the passage to the catalyst of the hydrocarbon material which is to be dehydrogenated and which is substantially free from more-unsaturated hydrocarbons.

11. In a process for the dehydrogenation of a hydrocarbon in the presence of a chromium oxide catalyst, the method for reducing the induction period of said catalyst, prior to using said catalyst for dehydrogenation, which comprises heating the catalyst at an elevated temperature in an atmosphere containing free hydrogen and subsequently flushing the catalyst for a period not in excess of several minutes with a gas comprising a substantial proportion of a hydrocarbon that is more unsaturated than the hydrocarbon which is to be dehydrogenated in the process, and thereafter passing the hydrocarbon that is to be dehydrogenated and that is substantially free from more-unsaturated hydrocarbons over the flushed catalyst.

12. In a process for the dehydrogenation of a hydrocarbon in the presence of a bauxite catalyst, the method for reducing the induction period of said catalyst, prior to using said catalyst for dehydrogenation, which comprises heating the catalyst at an elevated temperature in an atmosphere containing free hydrogen and subsequently flushing the catalyst for a period not in excess of several minutes with a gas comprising a substantial proportion of a hydrocarbon that is more unsaturated than the hydrocarbon which is to be dehydrogenated in the process, and thereafter passing the hydrocarbon that is to be dehydrogenated and that is substantially free from more-unsaturated hydrocarbons over the flushed catalyst.

13. In a process for the production of a butylene by the dehydrogenation of a butane in the presence of a chromium oxide catalyst, the method for reducing the induction period of said catalyst, which comprises heating the catalyst at an elevated temperature in an atmosphere containing free hydrogen and subsequently flushing the catalyst for a period not in excess of several minutes with a gas comprising a substantial proportion of ethylene, and thereafter passing the butane that is substantially free from more-unsaturated hydrocarbons over the flushed catalyst.

14. In a process for the production of a pentadiene by the dehydrogenation of an amylene in the presence of a chromium oxide catalyst, the method for reducing the induction period of said catalyst, which comprises heating the catalyst at an elevated temperature in an atmosphere containing free hydrogen and subsequently flushing the catalyst for a period not in excess of several minutes with a gas comprising a substantial proportion of ethylene, and thereafter passing the amylene that is substantially free from more-unsaturated hydrocarbons over the flushed catalyst.

15. In a process for the production of a butadiene by the dehydrogenation of a butylene in the presence of a bauxite catalyst, the method for reducing the induction period of said catalyst, which comprises heating the catalyst at an elevated temperature in an atmosphere containing free hydrogen and subsequently flushing the catalyst for a period not in excess of several minutes with a gas comprising a substantial proportion of butadiene, and thereafter passing the butylene that is substantially free from more-unsaturated hydrocarbons over the flushed catalyst.

16. In a process for the catalytic dehydrogenation of a hydrocarbon in which a mixture containing the hydrocarbon that is to be dehydrogenated and a smaller proportion of more-unsaturated hydrocarbon than that which is to be dehydrogenated is passed over a dehydrogenation catalyst, the method for reducing the induction period of the catalyst for said dehydrogenation, which comprises heating the catalyst at an elevated temperature in an atmosphere containing free hydrogen and subsequently flushing the catalyst for a period not in excess of several minutes with a gas mixture comprising a hydrocarbon that is more unsaturated than the hydrocarbon which is to be dehydrogenated in the process in a proportion that is substantially greater than that present in the hydrocarbon mixture that is to be passed over the catalyst in the dehydrogenation process, and thereafter passing the hydrocarbon mixture that is to be dehydrogenated over the flushed catalyst.

17. In a process for the catalytic dehydrogenation of a hydrocarbon, the method for reducing the induction period of the catalyst for said dehydrogenation, which comprises heating the catalyst to an elevated temperature in an atmosphere containing free hydrogen, subsequently passing a stream of the hydrocarbon that is to be dehydrogenated through the catalyst, shortly thereafter adding to said stream for a period of about a minute a substantial proportion of a hydrocarbon that is more-unsaturated than the hydrocarbon which is to be dehydrogenated, and thereafter continuing passing to the catalyst the hydrocarbon that is to be dehydrogenated and that is substantially free from more-unsaturated hydrocarbons.

18. In a process for the catalytic dehydrogenation of a hydrocarbon, the method for extending the useful life of the catalyst for said dehydrogenation, which comprises interrupting the passage of hydrocarbon material to the catalyst, passing a stream containing free hydrogen into contact with said catalyst while it is maintained at a temperature of approximately 50–150° C. higher than the dehydrogenating temperature, subsequently reestablishing the dehydrogenating temperature in the catalyst, subsequently resuming passage to the catalyst of the hydrocarbon material that is to be dehydrogenated, shortly thereafter adding to said hydrocarbon for a period of about a minute a substantial proportion of a hydrocarbon that is more-unsaturated than said hydrocarbon material to be dehydrogenated and thereafter continuing passage to the catalyst of the hydrocarbon material that is to be dehydrogenated and that is substantially free from more-unsaturated hydrocarbons.

MARYAN P. MATUSZAK.